(12) United States Patent
Yang et al.

(10) Patent No.: US 10,716,127 B2
(45) Date of Patent: Jul. 14, 2020

(54) UPLINK CHANNEL INFORMATION FEEDBACK TIMING SIGNALING IN WIRELESS COMMUNICATIONS

(71) Applicant: MediaTek Inc., Hsinchu (TW)

(72) Inventors: Weidong Yang, San Diego, CA (US); Lung-Sheng Tsai, Hsinchu (TW); Pei-Kai Liao, Hsinchu (TW); Jiann-Ching Guey, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/136,220

(22) Filed: Sep. 19, 2018

(65) Prior Publication Data

US 2019/0090261 A1 Mar. 21, 2019

Related U.S. Application Data

(60) Provisional application No. 62/560,231, filed on Sep. 19, 2017, provisional application No. 62/576,162, (Continued)

(51) Int. Cl.
*H04W 72/12* (2009.01)
*H04L 1/00* (2006.01)
(Continued)

(52) U.S. Cl.
CPC ....... *H04W 72/1268* (2013.01); *H04L 1/0026* (2013.01); *H04L 1/1854* (2013.01);
(Continued)

(58) Field of Classification Search
None
See application file for complete search history.

(56) References Cited

U.S. PATENT DOCUMENTS

| 8,891,461 B2 * | 11/2014 | Xiao | H04L 1/0028 370/329 |
| 9,402,247 B2 * | 7/2016 | Bala | H04L 5/001 |
| 9,986,454 B2 * | 5/2018 | Lee | H04L 5/0048 |
| 10,158,464 B2 * | 12/2018 | Yoon | H04B 7/024 |

(Continued)

FOREIGN PATENT DOCUMENTS

| CN | 102577551 A | 7/2012 |
| CN | 105981325 A | 9/2016 |

(Continued)

OTHER PUBLICATIONS

State Intellectual Property Office, International Search Report and Written Opinion for International Patent Application No. PCT/CN2018/106549, dated Nov. 30, 2018.

(Continued)

*Primary Examiner* — Eunsook Choi
(74) *Attorney, Agent, or Firm* — Han IP PLLC; Andy M. Han

(57) ABSTRACT

Various solutions with respect to uplink control information (UCI) feedback timing signaling in wireless communications are described. A user equipment (UE) identifies a type of uplink (UL) transmission to perform with respect to a network node of a wireless network. The UE receives a control signal from the network node and determines, based on the control signal, a timing offset of a transmission schedule for the identified type of the UL transmission. The UE performs the UL transmission to the network node according to the transmission schedule such that a first type of the UL transmission is performed with a first timing offset and a second type of the UL transmission is performed with a second timing offset different than the first timing offset.

20 Claims, 8 Drawing Sheets

Related U.S. Application Data filed on Oct. 24, 2017, provisional application No. 62/592,526, filed on Nov. 30, 2017.

(51) Int. Cl.
    *H04W 56/00*     (2009.01)
    *H04W 72/04*     (2009.01)
    *H04W 76/27*     (2018.01)
    *H04W 72/14*     (2009.01)
    *H04L 1/18*     (2006.01)
    *H04W 24/10*     (2009.01)
    *H04B 7/06*     (2006.01)

(52) U.S. Cl.
    CPC ..... *H04W 56/004* (2013.01); *H04W 72/0413* (2013.01); *H04W 72/0446* (2013.01); *H04W 72/14* (2013.01); *H04W 76/27* (2018.02); *H04B 7/0626* (2013.01); *H04L 1/0027* (2013.01); *H04W 24/10* (2013.01); *H04W 72/1284* (2013.01)

(56) References Cited

U.S. PATENT DOCUMENTS

| | | | |
|---|---|---|---|
| 10,390,335 B2* | 8/2019 | Choi | H04L 1/1887 |
| 10,397,906 B2* | 8/2019 | Yang | H04L 5/0053 |
| 2015/0223235 A1 | 8/2015 | Hwang et al. | |
| 2017/0180099 A1 | 6/2017 | Kim et al. | |
| 2018/0206224 A1* | 7/2018 | Hwang | H04L 27/26 |
| 2018/0332577 A1* | 11/2018 | Yang | H04L 5/0055 |
| 2018/0343046 A1* | 11/2018 | Park | H04B 7/0478 |
| 2019/0253198 A1* | 8/2019 | Baldemair | H04W 72/042 |

FOREIGN PATENT DOCUMENTS

| | | |
|---|---|---|
| WO | WO 2016159630 A1 | 10/2016 |
| WO | WO 2017/064004 A1 | 4/2017 |

OTHER PUBLICATIONS

Taiwan Intellectual Property Office, Office Action for Taiwan Patent Application No. 107133049, Oct. 1, 2019.

\* cited by examiner

| UL/DL Configuration | slot number n in radio frame f | | | | | | | | | | slot number n in radio frame f+1 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| 0 | D | | | | | D | | | | | D | | | | D | D | D | | | D |
| 1 | D | D | | | D | D | D | | D | D | D | D | | | D | D | D | | | D |

UPLINK CHANNEL INFORMATION FEEDBACK TIMING SIGNALING IN WIRELESS COMMUNICATIONS

CROSS REFERENCE TO RELATED PATENT APPLICATION(S)

The present disclosure is part of a non-provisional application claiming the priority benefit of U.S. Patent Application Nos. 62/560,231, 62/576,162 and 62/592,526, filed on 19 Sep. 2017, 24 Oct. 2017 and 30 Nov. 2017, respectively, the contents of which are incorporated by reference in their entirety.

TECHNICAL FIELD

The present disclosure is generally related to wireless communications and, more particularly, to uplink control information (UCI) feedback timing signaling in wireless communications.

BACKGROUND

Unless otherwise indicated herein, approaches described in this section are not prior art to the claims listed below and are not admitted as prior art by inclusion in this section.

In mobile communications in $5^{th}$-Generation (5G) and New Radio (NR) mobile networks, it was proposed that, for aperiodic channel state information (CSI) reporting on physical uplink shared channel (PUSCH), the possible timing offset values Y are the same as PUSCH scheduling offset determined in scheduling and hybrid automatic repeat request (HARQ) agenda item. However, as the PUSCH scheduling offset is determined by processing latency for PUSCH, and CSI feedback offset is determined by CSI processing latency, they may not overlap each other completely.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure proposes a number of solutions, schemes, methods and apparatus pertaining to UCI feedback timing signaling in wireless communications. It is believed that the proposed solutions, schemes, methods and apparatus may reduce transmission overhead, thereby improving system performance.

In one aspect, a method may involve a processor of a user equipment (UE) receiving a first control signal from a network node of a wireless network. The method may also involve the processor determining, based on the first control signal, a first set of timing offsets of a transmission schedule for each of a plurality of types of uplink (UL) transmissions. The method may also involve the processor receiving a second control signal from the network node. The method may further involve the processor identifying one of the plurality of types of UL transmissions to perform with respect to the network node based on the second control signal. The method may additionally involve the processor determining, based on the first and second control signals, a second set of timing offsets of the transmission schedule for the identified type of the UL transmissions. The method may further involve the processor performing the UL transmission to the network node according to the transmission schedule such that a first type of the UL transmission is performed with a value from the first set of timing offsets and a second type of the UL transmission is performed with a value from the second set of timing offsets different than the first set of timing offsets.

In one aspect, an apparatus may include a transceiver and a processor coupled to the transceiver. The transceiver may be capable of wirelessly communicating with a network node of a wireless network. The processor may be capable of: (a) receiving, via the transceiver, a first control signal from a network node of a wireless network; (b) determining, based on the first control signal, a first set of timing offsets of a transmission schedule for each of a plurality of types of uplink (UL) transmissions; (c) receiving, via the transceiver, a second control signal from the network node; (d) identifying one of the plurality of types of UL transmissions to perform with respect to the network node based on the second control signal; (e) determining, based on the first and second control signals, a second set of timing offsets of the transmission schedule for the identified type of the UL transmissions; and (f) performing, via the transceiver, the UL transmission to the network node according to the transmission schedule such that: (i) a first type of the UL transmission is performed with a value from the first set of timing offsets, and (ii) a second type of the UL transmission is performed with a value from the second set of timing offsets different than the first set of timing offsets.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies wherever applicable such as, for example and without limitation, LTE, LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 1 is a diagram of an example scenario of PUSCH scheduling timing offset in accordance with an implementation of the present disclosure.

FIG. 3 is a diagram of an example scenario of PUSCH scheduling timing offset in accordance with an implementation of the present disclosure.

DETAILED DESCRIPTION OF PREFERRED IMPLEMENTATIONS

Figure 2:
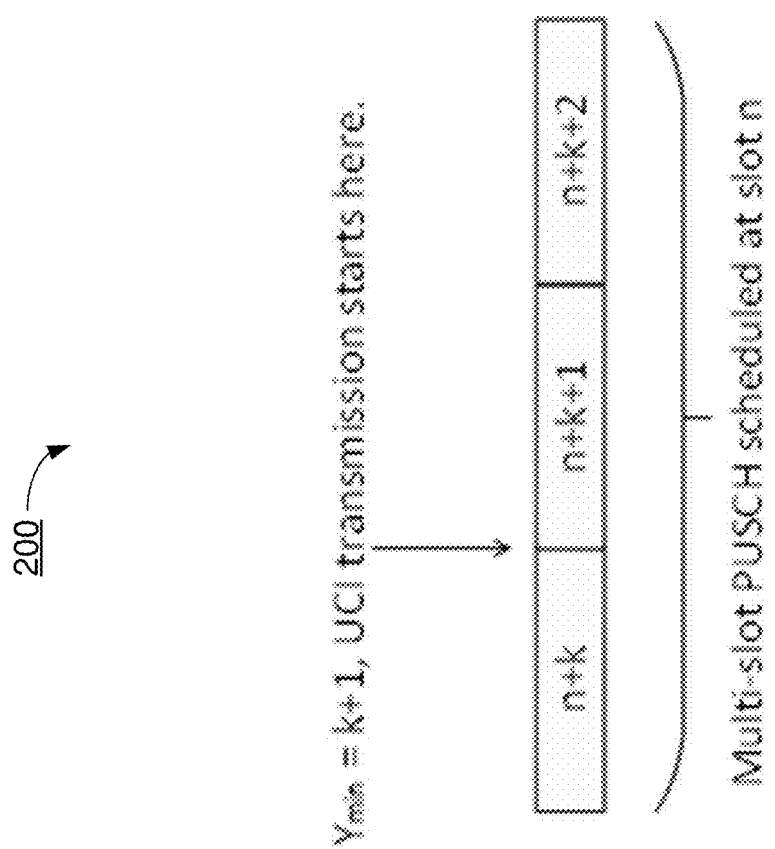
FIG. 2 is a diagram of an example scenario of multi-slot aggregation in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UCI feedback timing signaling in wireless communications. According to the present disclosure, a number of possible solutions may be implemented separately or jointly. That is, although these possible solutions may be described below separately, two or more of these possible solutions may be implemented in one combination or another.

CSI Feedback for Wide-Bandwidth Systems

In LTE, the maximum bandwidth is limited to 20 MHz, and the propagation conditions between a base station (e.g., eNodeB) and a UE served by the base station at different carrier tones are similar. Hence, conventional feedback framework with a dual-stage codebook and a single $W_1$ has served LTE well.

However, in 5G, the radio conditions between a base station (e.g., gNB) and a UE served by the base station at different carrier tones can be different. There may be several factors at play. Firstly, due to the much larger channel bandwidth in 5G, the propagation condition can be different at different tones (e.g., different number of clusters at the high frequency and the low frequency in the carrier bandwidth). Secondly, the 5G base station can reuse the radio front end of the existing LTE deployment. For example, if a front end of an LTE network operates from 3.6 GHz to 3.6 GHz+20 MHz, instead of building a new radio front end to cover 3.6 GHz to 3.5 GHz+40 MHz to support a 40 MHz 5G system, the operator may choose to build a 5G radio front end covering 3.6 GHz+20 MHz to 3.6 GHz+40 GHz, and the 5G radio signals may be routed to and from both radio front ends (one being the existing one deployed originally for LTE and one being the addition specifically for 5G) to save costs.

It is noteworthy that different antenna structures may be used at different frequencies in the carrier bandwidth in this case. As the propagation conditions at the higher frequency and the lower frequency are not the same, with different antenna structures being used, in general the propagation conditions are different and the quasi-colocation (QCL) assumptions for both data transmission channel state information reference signal (CSI-RS) at the lower and higher frequencies are different. Thirdly, the interference situations can be drastically different at the higher frequency and the lower frequency.

Yet, it may be still preferable to treat the higher frequency and the lower frequency as parts of a single carrier bandwidth due to considerations such as system overhead (e.g., sharing all the overhead channels such as primary synchronization signals (PSS)/secondary synchronization signals (SSS), physical random access channel (PRACH), broadcast channel (BCH), and so on), better trunking efficiency (e.g., shared paging capacity), lower signaling overhead (e.g., using one physical downlink control channel (PDCCH) to schedule physical downlink shared channel (PDSCH) and physical uplink shared channel (PUSCH) over the higher frequency and lower frequency). As such, a number of changes may be necessary.

Under a proposed scheme in accordance with the present disclosure, a first change may involve taking the QCL assumptions for CSI-RS and PDSCH and demodulation reference signal (DMRS) for sub-part of the carrier bandwidth and/or bandwidth part(s) (BWP), and the partitioning of BWP or carrier bandwidth may be radio resource control (RRC) configured for a UE to save signaling overhead in dynamic signaling (e.g., downlink control information (DCI)). Moreover, due to possible differences in the propagation conditions and interference situation of a desired signal, a single rank indication (RI) or a single wideband $W_1$ may not be enough. Thus, under the proposed scheme, the UE may be configured to report CSI-RS resource index (CRI), RI, $W_1$, $W_2$ and channel quality indicator(s) for each configured sub-part of the BWP/carrier bandwidth. To simplify the UCI reporting rule, the CSI report for different sub-parts may follow the design for carrier aggregation cases. For instance, suppose there are two sub-parts (cc-1-part1 and cc-1-part2) under carrier 1, and two sub-parts (cc-2-part1 and cc-2-part2) under carrier 2, the CSI aggregation rule may be defined according to cc-1-part1, cc-1-part2, cc-2-part1, cc-2-part2 (according to carrier index first). Alternatively, the CSI aggregation rule may be defined according to cc-1-part1 cc-2-part1, cc-1-part2, cc-2-part2 (according to sub-part index first).

Under the proposed scheme, on the base station side, the base station may schedule multiple PDSCHs over sub-parts with multiple PDCCHs to a UE simultaneously, potentially with different transmission ranks and MCS levels and precoders. Each PDSCH may or may not be confined within a sub-part. The base station may also choose to schedule a single PDSCH with a single PDCCH over multiple sub-parts. Moreover, the precoding matrix indicators (PMIs) for each sub-part may follow the CSI feedback of the UE for respective sub-parts; hence the UE takes different QCL assumptions for PDSCH reception on those sub-parts.

UCI Feedback Timing Signaling in NR

Considering frequency-division duplexing (FDD), assuming $K_{min}$ as the minimum PUSCH scheduling timing offset achieved with a set of conditions (such as a given numerology, resource allocation and size of the relevant BWP, transport block size (TBS), coding rate, and so on), then PUSCH scheduling offset may take a value from $K_{min}$, $K_{min}+1$, $K_{min}+2$, $K_{min}+3$, . . . . Due to limitation in the bit width for PUSCH scheduling offset in the uplink (UL) DCI, only a limited number of values are allowed. For example, with two bits for the relevant signaling, {$K_{min}$, $K_{min}+1$, $K_{min}+2$, $K_{min}+3$} are allowed. To benefit from the considerations on low latency design in NR, it is desirable that the value of $K_{min}$ is as low as possible.

Considering the case of FDD for CSI feedback, assuming $Y_{min}$ as the minimum CSI feedback timing offset with a given set of conditions (e.g., Set 1 of conditions) such as a given numerology, size of the relevant BWP and the subband size configuration (e.g., with BWP size and the subband size determining the number of subbands for CQI feedback), the number of ports for CSI feedback, the type of CSI feedback (e.g., Type I or Type II), wideband versus subband, a single CSI reporting, and so on. Then, for other sets of conditions (e.g., Set 2 of conditions for CSI reporting for three cells), $Y_{min}$ the required minimum CSI feedback timing offset may be different.

Considering time-division duplexing (TDD), if semi-static downlink/uplink (DL/UL) configuration or split is used for a UE, then it is noteworthy that the allowable minimum PUSCH scheduling timing offset in general may depend on the scheduling slot n in a radio frame. This point can be illustrated with the "k" value table from TD-LTE design (TS 36.231, Rel-13). The usage of "K" is specified in Clause 8.2 of TS 36.213 as follows: "For TDD UL/DL configurations 1-6 and normal HARQ operation, the UE shall upon detection of a PDCCH with DCI format 0 and/or a PHICH transmission in subframe n intended for the UE, adjust the corresponding PUSCH transmission in subframe n+k, with k given in Table 8-2, according to the PDCCH and PHICH information."

TABLE 8-2 k for TDD configurations 0-6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | 6 | | | 4 | | 6 | | | 4 |
| 2 | | | 4 | | | | | 4 | | |
| 3 | 4 | | | | | | | 4 | 4 | |
| 4 | | | | | | | | 4 | 4 | |
| 5 | | | | | | | 4 | | | |
| 6 | | 7 | 7 | | | | 7 | 7 | | 5 |

In NR, the UL/DL slot configuration may be either semi-statically configured to a UE or dynamically indicated to the UE with a group-common PDCCH for example. FIG. 1 illustrates an example scenario 100 of PUSCH scheduling timing offset in accordance with an implementation of the present disclosure. In FIG. 1, "D" stands for a slot where PDCCH can be transmitted and PUSCH is not allowed. Assuming $K_{min}=3$ under a set of conditions, a case with allowable values for the PUSCH scheduling timing offset from {3,4,7,8} for an UL grant received at a UE on slot 0 in radio frame f can arise as shown in FIG. 1. Note in this case the allowable values may not be contiguous integers.

In an event that the allowable timing offset values (e.g., {3,4,7,8}) are configured through RRC signaling, a mapping from the PUSCH scheduling timing offset in UL grant DCI may be established so that "00"→k=3, "01"→k=4, "10"→k=7, "11"→k=8. In the example shown in FIG. 1, the code state "01" may not be useful for an UL grant DCI received in slot 1 since it would point to a slot (slot 5) for DL transmission.

One way to make all code states useful in addressing to slots feasible for UL transmission may be for an UL grant received in slot n, the first slot from slot n+$K_{min}$ and slots thereafter where PUSCH can be conducted may be pointed by the first code state for PUSCH scheduling timing offset (e.g., "00"), and the second slot from slot n+$K_{min}$ and slots thereafter where PUSCH can be conducted may be pointed by the second code state for PUSCH scheduling timing offset (e.g., "01"), and so on. Then, for an UL grant received on slot 0, "00"→k=3, "01"→k=4, "10"→k=7, "11"→k=8. For an UL grant received on slot 1, "00"→k=4, "01"→k=7, "10"→k=8, "11"→k=9.

When UCI (e.g., including CSI reporting, beam reporting, HARQ acknowledgement, scheduling request (SR) and the like) is multiplexed with PUSCH, the timing offset for UCI feedback may be the same as the PUSCH scheduling timing offset as UCI and PUSCH are transmitted in the same slot(s). For instance, slot aggregation or transmit time interval (TTI) bundling may be used for PUSCH and UCI. However, not all allowable PUSCH scheduling timing offset values are also allowable UCI feedback timing offset values as analyzed above.

Under Set 1 of conditions, $Y_{min}$ may be larger or smaller than $K_{min}$. It is undesirable to let the PUSCH scheduling timing offset dictate the UCI feedback timing offset. For example, if $K_{min}=3$ and $Y_{min}=2$, then it would be necessary to budget the field for PUSCH scheduling timing offset (e.g., with UCI multiplexed with data over PUSCH) or UCI feedback timing offset (e.g., UCI without data and PUSCH with data) with allowable values from {2,3,4,5,6} for FDD. Here, {2} may be used for UCI without data over PUSCH, and {3,4,5,6} may be used for UCI multiplexed with data. Accordingly, two bits may be needed for signaling PUSCH/UCI timing offset.

Under a proposed scheme in accordance with the present disclosure, a better design may be to define the code state-to-UCI timing offset association differently depending on whether an UL grant schedules a transmission of UCI without data or UCI multiplexed with data. For UCI multiplexed with data, the mapping rules as given above may apply for PUSCH scheduling timing offset. The UCI reporting may start at the earliest slot within the slot(s) for the scheduled PDSCH on slot n+$Y_{min}$ or thereafter. FIG. 2 illustrates an example scenario 200 of multi-slot aggregation in accordance with an implementation of the present disclosure.

For UCI without data, for an UL grant received in slot n, the first slot from slot n+$Y_{min}$ and slots thereafter where PUSCH can be conducted may be pointed by the first code state for UCI feedback timing offset (e.g., "00"), and the second slot from slot n+$Y_{min}$ and slots thereafter where PUSCH can be conducted may be pointed by the second code state for PUSCH scheduling timing offset (e.g., "01"), and so on.

Figure 3:
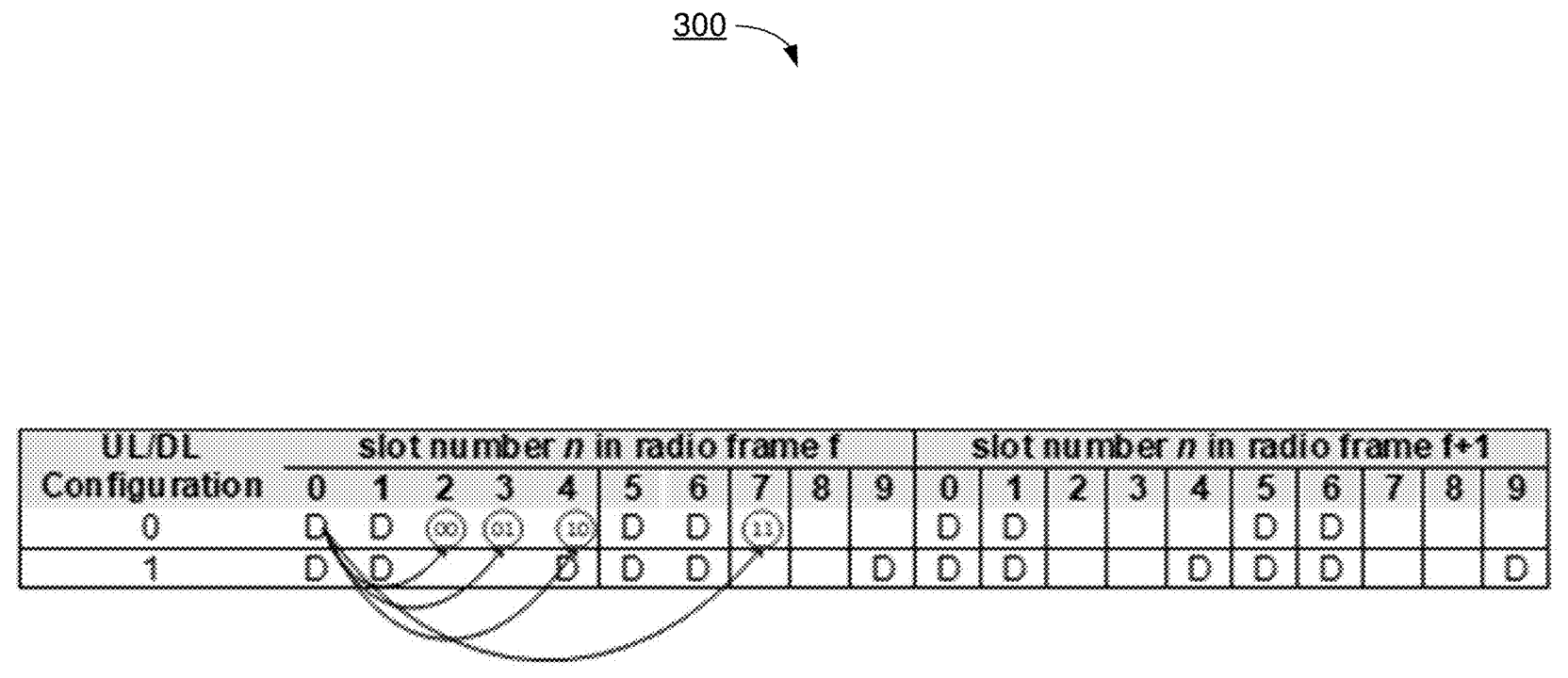

FIG. 3 illustrates an example scenario 300 of PUSCH scheduling timing offset in accordance with an implementation of the present disclosure. In FIG. 3, with $Y_{min}=1$ and slot 1 being a DL slot, code state "00" points to UCI-only transmission in slot 2, code state "01" points to UCI-only transmission in slot 3, and so on.

Figure 4:
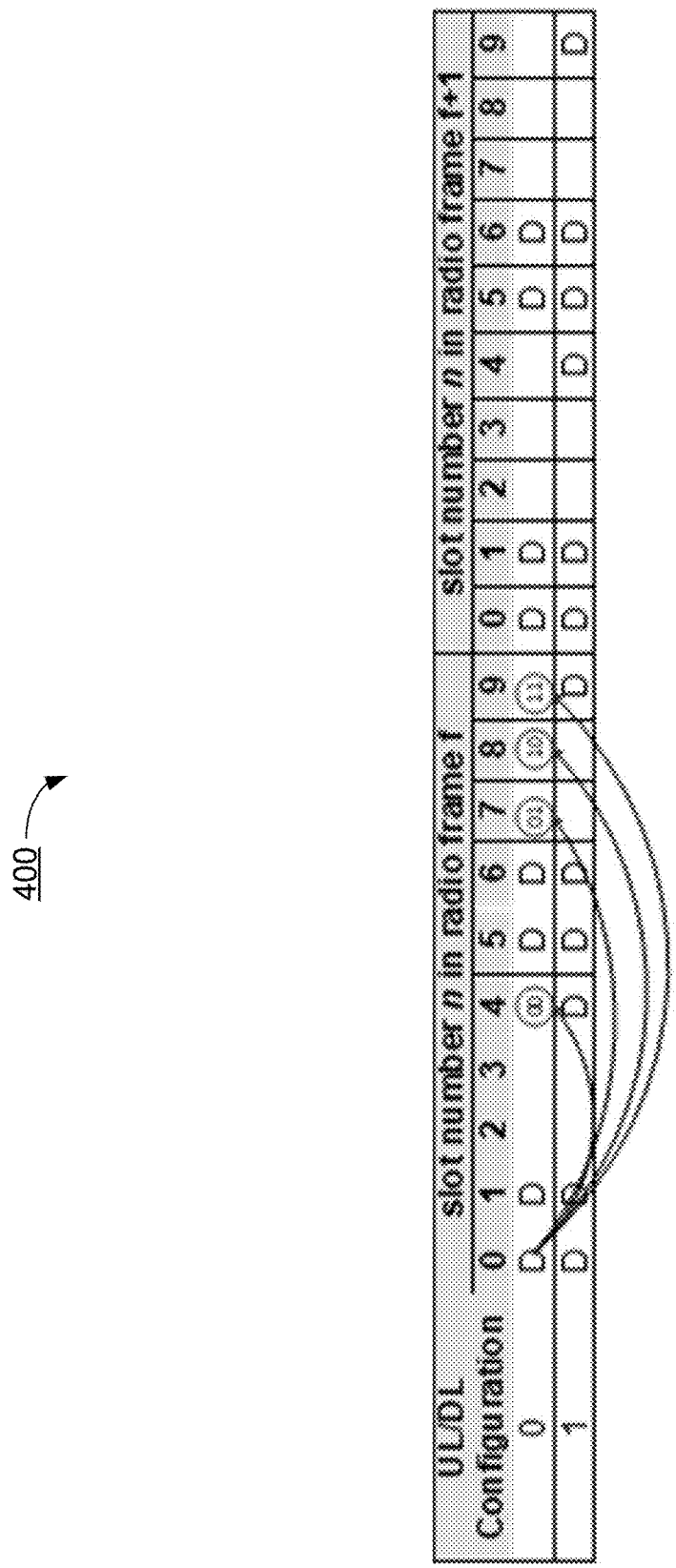
FIG. 4 is a diagram of an example scenario of PUSCH scheduling timing offset in accordance with an implementation of the present disclosure.

Alternatively, the mapping between code states in the case of UCI-only and timing offsets is through RRC signaling, RRC signaling and/or mapping may be separated from that for PUSCH scheduling timing offset. FIG. 4 illustrates an example scenario 400 of PUSCH scheduling timing offset in accordance with an implementation of the present disclosure. In the example shown in FIG. 4, RRC signaling can be used to establish "00"→Y=4, "01"→Y=7, "10"→Y=8, "11"→Y=9.

In view of the above, for an UL DCI with the field shown below, different mapping rules from code states to timing offsets may be used for the UCI-only case and UCI-multiplexed-with-data case. In a DCI design with a field "PUSCH-scheduling/CSI-feedback-timing-offset", the mapping rule for the field is different depending on whether it is UCI-only transmission or not.

```
DCI ={
.....
PUSCH-scheduling/CSI-feedback-timing-offset,
.....
}
```

Alternatively, the UL DCI for UCI-only case may be given by:

```
DCI ={
.....
CSI-feedback-timing-offset,
.....
}
```

Moreover, the UL DCI for the UCI-multiplexed-with-data case may be given by:

```
DCI ={
.....
PUSCH-scheduling/CSI-feedback-timing-offset,
.....
}
```

Accordingly, under the proposed scheme, different mapping rules from code states to timing offsets may be used for the UCI-only case and UCI-multiplexed-with-data case. That is, CSI timing offset may be determined separately for UCI-only transmission and UCI-multiplexed-with-data transmission.

Figure 5:
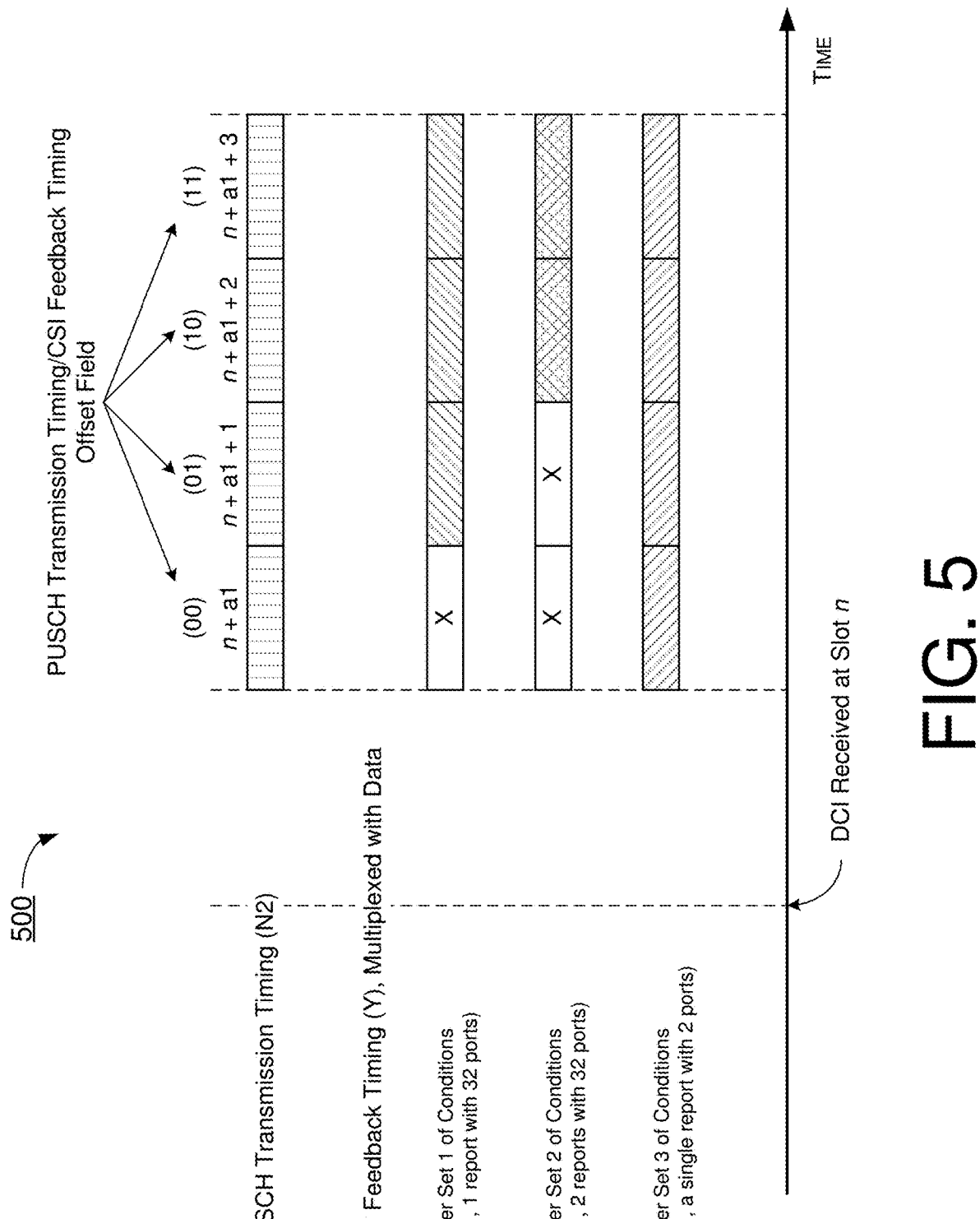
FIG. 5 is a diagram of an example scenario of uplink transmission timing for UCI with data in accordance with an implementation of the present disclosure.

FIG. 5 illustrates an example scenario 500 of uplink transmission timing for UCI with data in accordance with an implementation of the present disclosure. In scenario 500, for an UL grant received on slot n via DCI, the PUSCH transmission timing and CSI feedback timing offset fields may correspond to slots n+a1, n+a1+1, n+a1+2 and n+a1+3 (which correspond to code states "00", "01", "10" and "11"). In scenario 500, there may be a number of conditions under which a UE may transmit CSI feedback multiplexed with data such as, for example and without limitation, Set 1 of conditions, Set 2 of conditions and Set 3 of conditions. The UL transmission under Set 1 of conditions may involve, for example, one report with 32 ports. The UL transmission under Set 2 of conditions may involve, for example, two reports with 32 ports. The UL transmission under Set 3 of conditions may involve, for example, a single report with 2 ports. As shown in FIG. 5, transmission of CSI feedback (as part of UCI feedback) multiplexed with data may occur in the same time frame of PUSCH transmission.

Figure 6:
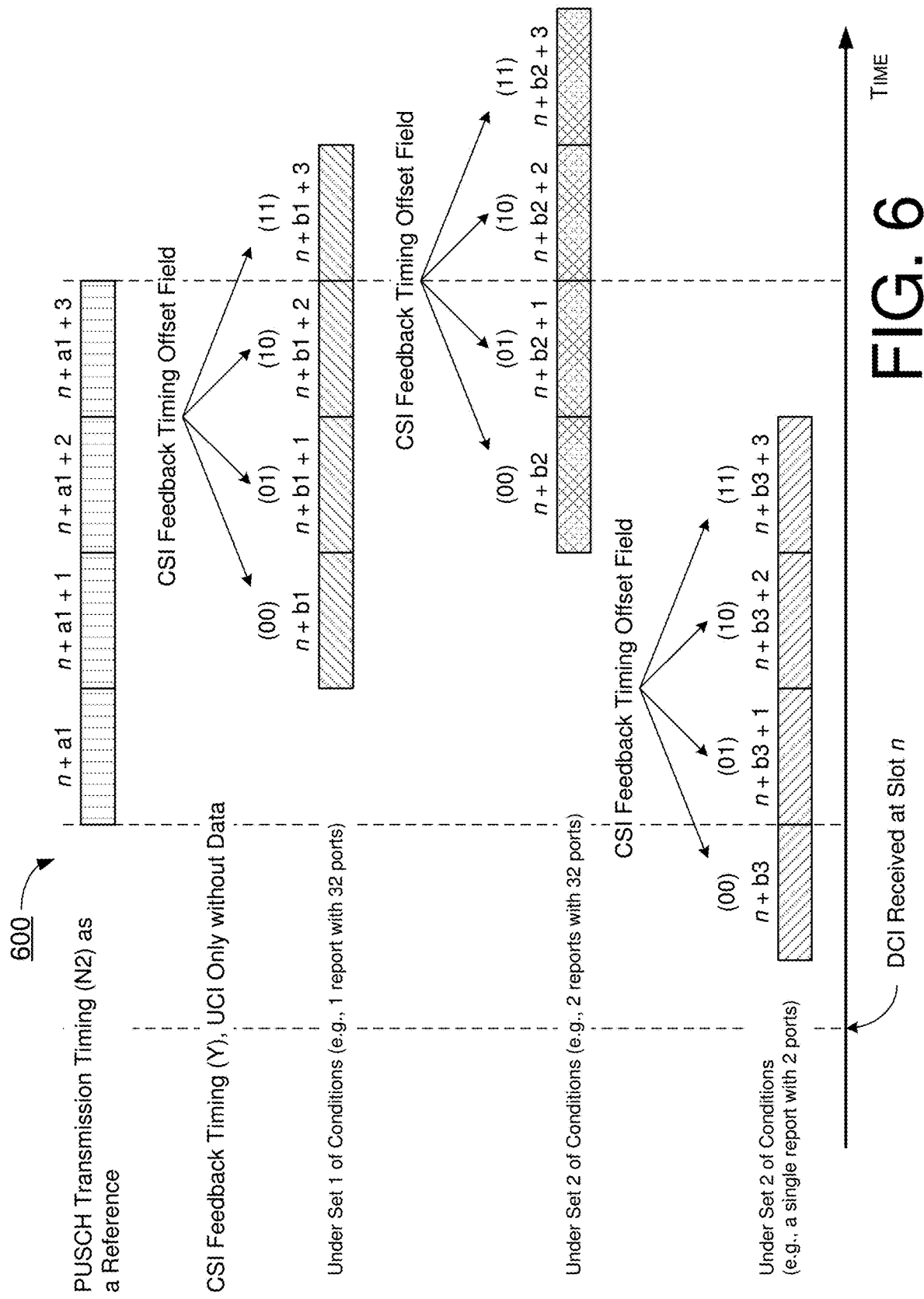
FIG. 6 is a diagram of an example scenario of uplink transmission timing for UCI without data in accordance with an implementation of the present disclosure.

FIG. 6 illustrates an example scenario 600 of uplink transmission timing for UCI without data in accordance with an implementation of the present disclosure. In scenario 600, for an UL grant received on slot n via DCI, the timing offset for PUSCH transmission and the timing offset for CSI feedback (as part of UCI feedback) are different. As shown in FIG. 6, transmission of CSI feedback (as part of UCI feedback) without data may occur outside the time frame of PUSCH transmission. The PUSCH transmission timing offset fields may correspond to slots n+a1, n+a1+1, n+a1+2 and n+a1+3.

The CSI feedback transmission timing offset may depend on the condition under which a UE transmits the CSI feedback without data. In scenario 600, there may be a number of conditions under which a UE may transmit CSI feedback multiplexed with data such as, for example and without limitation, Set 1 of conditions, Set 2 of conditions and Set 3 of conditions. The UL transmission under Set 1 of conditions may involve, for example, one report with 32 ports. The UL transmission under Set 2 of conditions may involve, for example, two reports with 32 ports. The UL transmission under Set 3 of conditions may involve, for example, a single report with 2 ports. For transmission of CSI feedback without data under Set 1 of conditions, the code states "00", "01", "10" and "11" may correspond to the timing offset fields n+b1, n+b1+1, n+b1+2 and n+b1+3. For transmission of CSI feedback without data under Set 2 of conditions, the code states "00", "01", "10" and "11" may correspond to the timing offset fields n+b2, n+b2+1, n+b2+2 and n+b2+3. For transmission of CSI feedback without data under Set 3 of conditions, the code states "00", "01", "10" and "11" may correspond to the timing offset fields n+b3, n+b3+1, n+b3+2 and n+b3+3.

Illustrative Implementations

Figure 7:
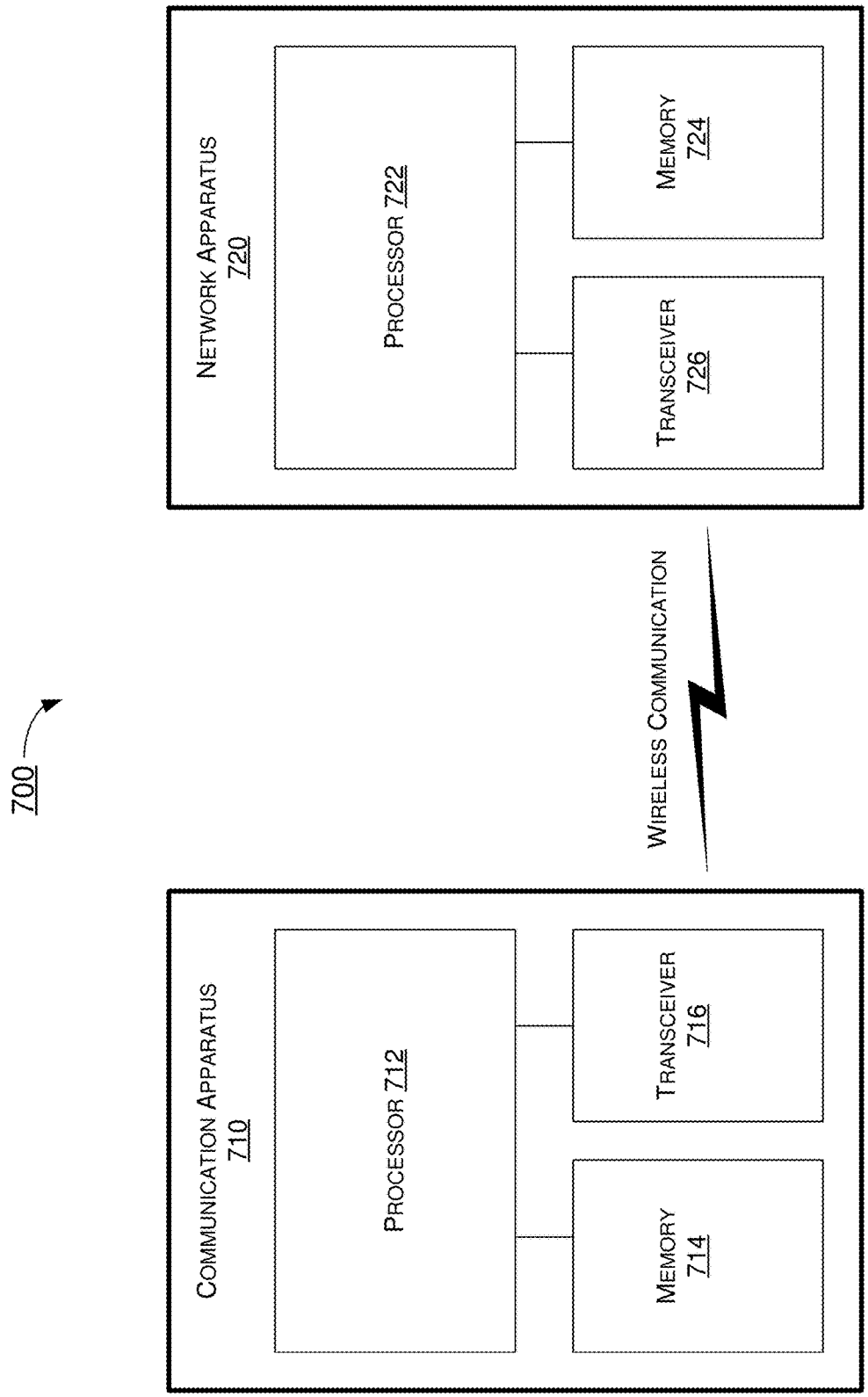
FIG. 7 is a block diagram of an example wireless communication environment in accordance with an implementation of the present disclosure.

FIG. 7 illustrates an example wireless communication environment 700 in accordance with an implementation of the present disclosure. Wireless communication environment 700 may involve a communication apparatus 710 and a network apparatus 720 in wireless communication with each other. Each of communication apparatus 710 and network apparatus 720 may perform various functions to implement procedures, schemes, techniques, processes and methods described herein pertaining to UCI feedback timing signaling in wireless communications, including the various procedures, scenarios, schemes, solutions, concepts and techniques described above as well as process 800 described below.

Communication apparatus 710 may be a part of an electronic apparatus, which may be a UE such as a portable or mobile apparatus, a wearable apparatus, a wireless communication apparatus or a computing apparatus. For instance, communication apparatus 710 may be implemented in a smartphone, a smartwatch, a personal digital assistant, a digital camera, or a computing equipment such as a tablet computer, a laptop computer or a notebook computer. Moreover, communication apparatus 710 may also be a part of a machine type apparatus, which may be an IoT or NB-IoT apparatus such as an immobile or a stationary apparatus, a home apparatus, a wire communication apparatus or a computing apparatus. For instance, communication apparatus 710 may be implemented in a smart thermostat, a smart fridge, a smart door lock, a wireless speaker or a home control center. Alternatively, communication apparatus 710 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Communication apparatus 710 may include at least some of those components shown in FIG. 7 such as a processor 712, for example. Communication apparatus 710 may further include one or more other components not pertinent to the proposed scheme of the present disclosure (e.g., internal power supply, display device and/or user interface device), and, thus, such component(s) of communication apparatus 710 are neither shown in FIG. 7 nor described below in the interest of simplicity and brevity.

Network apparatus 720 may be a part of an electronic apparatus, which may be a network node such as a TRP, a base station, a small cell, a router or a gateway. For instance, network apparatus 720 may be implemented in an eNodeB in an LTE, LTE-Advanced or LTE-Advanced Pro network or in a gNB in a 5G, NR, IoT or NB-IoT network. Alternatively, network apparatus 720 may be implemented in the form of one or more IC chips such as, for example and without limitation, one or more single-core processors, one or more multi-core processors, one or more RISC processors, or one or more CISC processors.

Network apparatus 720 may include at least some of those components shown in FIG. 7 such as a processor 722, for example. Network apparatus 720 may further include one or more other components not pertinent to the proposed scheme of the present disclosure (e.g., internal power supply, display device and/or user interface device), and, thus, such component(s) of network apparatus 720 are neither shown in FIG. 7 nor described below in the interest of simplicity and brevity.

In one aspect, each of processor 712 and processor 722 may be implemented in the form of one or more single-core processors, one or more multi-core processors, one or more RISC processors, or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks pertaining to UCI feedback timing signaling in wireless communications in accordance with various implementations of the present disclosure.

In some implementations, communication apparatus 710 may also include a transceiver 716 coupled to processor 712 and capable of wirelessly transmitting and receiving data, signals and information. In some implementations, communication apparatus 710 may further include a memory 714 coupled to processor 712 and capable of being accessed by processor 712 and storing data therein. In some implementations, network apparatus 720 may also include a transceiver 726 coupled to processor 722 and capable of wirelessly transmitting and receiving data, signals and information. In some implementations, network apparatus 720 may further include a memory 724 coupled to processor 722 and capable of being accessed by processor 722 and storing data therein. Accordingly, communication apparatus 710 and network apparatus 720 may wirelessly communicate with each other via transceiver 716 and transceiver 726, respectively.

To aid better understanding, the following description of the operations, functionalities and capabilities of each of communication apparatus 710 and network apparatus 720 is provided in the context of a mobile communication environment in which communication apparatus 710 is implemented in or as a communication apparatus or a UE and network apparatus 720 is implemented in or as a network node (e.g., gNB or TRP) of a wireless network (e.g., 5G/NR mobile network).

Under various proposed schemes in accordance with the present disclosure, processor 712 may receive, via transceiver 716, a control signal from network apparatus 720; processor 712 may determine, based on the control signal, a timing offset of a transmission schedule for the identified type of the UL transmission. In another word, the UE receives from the network a RRC configuration on the mapping between a DCI field's code states and transmission timing offsets for the UCI-only PUSCH transmission and UCI/data multiplexed PUSCH transmission. Additionally, processor 712 may receive, via transceiver 716, another control signal from network apparatus 720 for dynamic signaling in the form of a DCI. Processor 712 of communication apparatus 710 may identify a type of UL transmission to perform with respect to network apparatus 720 from the received dynamic signaling. Moreover, processor 712 may determine, based on the control signal, a timing offset of a transmission schedule for the identified type of the UL transmission. Furthermore, processor 712 may perform, via transceiver 716, the UL transmission to network apparatus 720 according to the transmission schedule such that: (i) a first type of the UL transmission is performed with a first timing offset, and (ii) a second type of the UL transmission is performed with a second timing offset different than the first timing offset.

Under various proposed schemes in accordance with the present disclosure, processor 712 may receive, via transceiver 716, a first control signal (e.g., RRC signaling) from network apparatus 720. Processor 712 may determine, based on the first control signal, a first set of timing offsets of a transmission schedule for each of a plurality of types of US transmissions. Processor 712 may also receive, via transceiver 716, a second control signal (e.g., DCI) from network apparatus 720. Processor 712 may identify one of the plurality of types of UL transmissions to perform with respect to the network node based on the second control signal. Processor 712 may also determine, based on the first and second control signals, a second set of timing offsets of the transmission schedule for the identified type of the UL transmissions. Processor 712 may further perform, via transceiver 716, a UL transmission to network apparatus 720 according to the transmission schedule such that: (i) a first type of the UL transmission is performed with a value from the first set of timing offsets, and (ii) a second type of the UL transmission is performed with a value from the second set of timing offsets different than the first set of timing offsets.

In some implementations, the first type of the UL transmission may involve a transmission of a UCI feedback multiplexed with data over a PUSCH. Moreover, the second type of the UL transmission may involve a transmission of the UCI feedback without data over the PUSCH.

In some implementations, in identifying the one of the plurality of types of the UL transmissions, processor 712 may identify the one of the plurality of types of the UL transmissions of a UCI feedback multiplexed with data over a PUSCH. In some implementations, a timing offset for the UL transmission of the UCI feedback multiplexed with data may equal a timing offset for PUSCH scheduling.

In some implementations, in identifying the one of the plurality of types of the UL transmissions, processor 712 may identify the one of the plurality of types of the UL transmissions of a UCI feedback multiplexed with data over a PUSCH. In some implementations, a timing offset for the UL transmission of the UCI feedback multiplexed with data may differ from a timing offset for PUSCH scheduling.

In some implementations, in receiving the control signal from network apparatus 720, processor 712 may perform a number of operations. For instance, processor 712 may receive RRC signaling. Moreover, processor 712 may configure timing offset values for the UL transmission based on the RRC signaling. In some implementations, in configuring the timing offset values for the UL transmission, processor 712 may establish a mapping of timing offset values for PUSCH scheduling as indicated in UL DCI in the control signal to corresponding code states. Additionally, processor 712 may receive, via transceiver 716, another control signal from network apparatus 720 for dynamic signaling in the form of a DCI. In some implementations, in identifying the one of the plurality of types of the UL transmissions, processor 712 may identify the one of the plurality of types of the UL transmissions as a transmission of a UCI feedback without data.

In some implementations, in determining the first set of timing offsets of the transmission schedule based on the first control signal, processor 712 may determine the first set of timing offsets as measured from a time at which the first control signal is received.

In some implementations, in performing the UL transmission, processor 712 may perform the UL transmission under one of a plurality of sets of conditions related to one or more of a numerology, a resource allocation or size of a bandwidth part (BWP), a transport block size, a coding rate, a subband size configuration, a number of ports for CSI feedback, a type of CSI feedback, a number of CSI reports, and a type of bandwidth for the UL transmission.

In some implementations, in identifying the one of the plurality of types of the UL transmissions, processor 712 may identify the one of the plurality of types of the UL transmissions of a UCI feedback multiplexed with data over a PUSCH. In some implementations, a timing offset for the UL transmission of the UCI feedback multiplexed with data may equal a timing offset for PUSCH scheduling. In such cases, the UL transmission of the UCI feedback multiplexed with the data under each set of the plurality of sets of conditions may be performed within a time frame of the PUSCH.

In some implementations, in identifying the one of the plurality of types of the UL transmissions, processor 712 may identify the one of the plurality of types of the UL transmissions of a UCI feedback multiplexed with data over a PUSCH. In some implementations, a timing offset for the UL transmission of the UCI feedback multiplexed with data differs from a timing offset for PUSCH scheduling. In such cases, the UL transmission of the UCI feedback without data under one or more sets of the plurality of sets of conditions may be performed outside a time frame of the PUSCH.

Illustrative Processes

Figure 8:
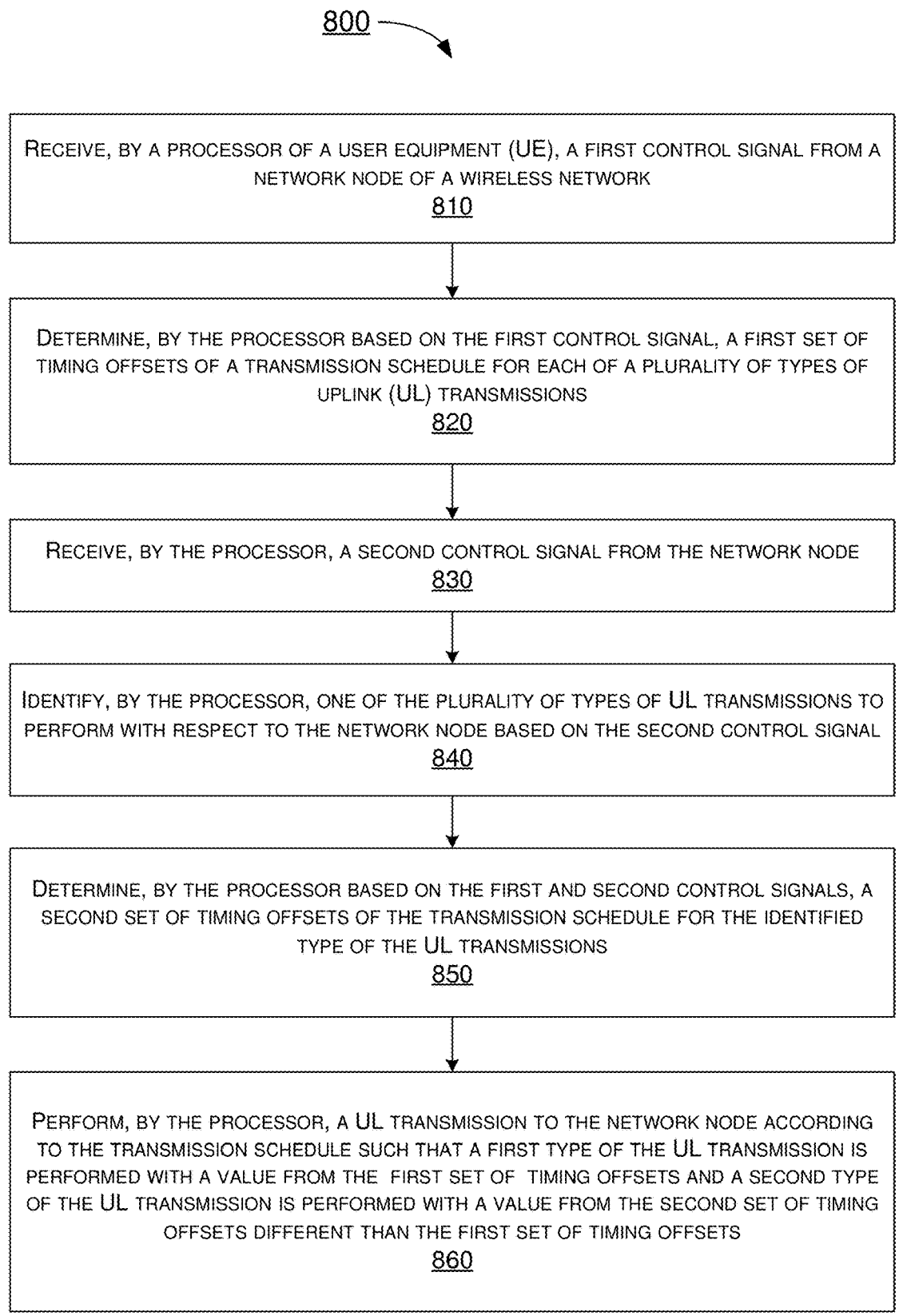
FIG. 8 is a flowchart of an example process in accordance with an implementation of the present disclosure.

FIG. 8 illustrates an example process 800 in accordance with an implementation of the present disclosure. Process 800 may be an example implementation of the various procedures, scenarios, schemes, solutions, concepts and techniques, or a combination thereof, whether partially or completely, with respect to UCI feedback timing signaling in wireless communications in accordance with the present disclosure. Process 800 may represent an aspect of implementation of features of communication apparatus 710. Process 800 may include one or more operations, actions, or functions as illustrated by one or more of blocks 810, 820, 830, 840, 850 and 860. Although illustrated as discrete blocks, various blocks of process 800 may be divided into additional blocks, combined into fewer blocks, or eliminated, depending on the desired implementation. Moreover, the blocks of process 800 may executed in the order shown in FIG. 8 or, alternatively, in a different order, and one or more of the blocks of process 800 may be repeated one or more times. Process 800 may be implemented by communication apparatus 710 or any suitable UE or machine type devices. Solely for illustrative purposes and without limitation, process 800 is described below in the context of communication apparatus 710 as a UE and network apparatus 720 as a network node (e.g., gNB) of a wireless network (e.g., 5G/NR mobile network). Process 800 may begin at block 810.

At 810, process 800 may involve processor 712 of communication apparatus 710 receiving a first control signal (e.g., RRC signaling) from network apparatus 720. Process 800 may proceed from 810 to 820.

At 820, process 800 may involve processor 712 determining, based on the first control signal, a first set of timing offsets of a transmission schedule for each of a plurality of types of UL transmissions. Process 800 may proceed from 820 to 830.

At 830, process 800 may involve processor 712 receiving a second control signal (e.g., DCI) from network apparatus 720. Process 800 may proceed from 830 to 840.

At 840, process 800 may involve processor 712 identifying one of the plurality of types of UL transmissions to perform with respect to network apparatus 720 based on the second control signal. Process 800 may proceed from 840 to 850.

At 850, process 800 may involve processor 712 determining, based on the first and second control signals, a second set of timing offsets of the transmission schedule for the identified type of the UL transmissions. Process 800 may proceed from 850 to 860.

At 860, process 800 may involve processor 712 performing, via transceiver 716, the UL transmission to network apparatus 720 according to the transmission schedule such that a first type of the UL transmission is performed with a value from the first set of timing offsets and a second type of the UL transmission is performed with a value from the second set of timing offsets different than the first set of timing offsets.

In some implementations, the first type of the UL transmission may involve a transmission of a UCI feedback multiplexed with data over a PUSCH. Moreover, the second type of the UL transmission may involve a transmission of the UCI feedback without data over the PUSCH.

In some implementations, in identifying the one of the plurality of types of the UL transmissions, processor 800 may involve processor 712 identifying the one of the plurality of types of the UL transmissions of a UCI feedback multiplexed with data over a PUSCH. In some implementations, a timing offset for the UL transmission of the UCI feedback multiplexed with data may equal a timing offset for PUSCH scheduling.

In some implementations, in identifying the one of the plurality of types of the UL transmissions, processor 800 may involve processor 712 identifying the one of the plurality of types of the UL transmissions of a UCI feedback multiplexed with data over a PUSCH. In some implementations, a timing offset for the UL transmission of the UCI feedback multiplexed with data may differ from a timing offset for PUSCH scheduling.

In some implementations, in identifying the one of the plurality of types of the UL transmissions, processor 800 may involve processor 712 identifying the one of the plurality of types of the UL transmissions as a transmission of a UCI feedback without data. In some implementations, in receiving the first control signal from network apparatus 720, processor 800 may involve processor 712 performing a number of operations. For instance, processor 800 may involve processor 712 receiving RRC signaling. Moreover, processor 800 may involve processor 712 configuring timing offset values for the UL transmission based on the RRC signaling. In some implementations, in configuring the timing offset values for the UL transmission, processor 800 may involve processor 712 establishing a mapping of timing offset values for PUSCH scheduling as indicated in UL DCI in the control signal to corresponding code states.

In some implementations, in determining the first set of timing offsets of the transmission schedule based on the first control signal, processor 800 may involve processor 712 determining the first set of timing offsets as measured from a time at which the first control signal is received.

In some implementations, in performing the UL transmission, processor 800 may involve processor 712 performing the UL transmission under one of a plurality of sets of conditions related to one or more of a numerology, a resource allocation or size of a bandwidth part (BWP), a transport block size, a coding rate, a subband size configuration, a number of ports for CSI feedback, a type of CSI feedback, a number of CSI reports, and a type of bandwidth for the UL transmission.

In some implementations, in identifying the one of the plurality of types of the UL transmissions, processor 800 may involve processor 712 identifying the one of the plurality of types of the UL transmissions of a UCI feedback multiplexed with data over a PUSCH. In some implementations, a timing offset for the UL transmission of the UCI feedback multiplexed with data may equal a timing offset for PUSCH scheduling. In such cases, the UL transmission of the UCI feedback multiplexed with the data under each set of the plurality of sets of conditions may be performed within a time frame of the PUSCH.

In some implementations, in identifying the one of the plurality of types of the UL transmissions, processor 800 may involve processor 712 identifying the one of the plurality of types of the UL transmissions of a UCI feedback multiplexed with data over a PUSCH. In some implementations, a timing offset for the UL transmission of the UCI feedback multiplexed with data differs from a timing offset for PUSCH scheduling. In such cases, the UL transmission of the UCI feedback without data under one or more sets of the plurality of sets of conditions may be performed outside a time frame of the PUSCH.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of a user equipment (UE), a first control signal from a network node of a wireless network;
   determining, by the processor based on the first control signal, a plurality of sets of timing offsets of a transmission schedule for a plurality of types of uplink (UL) transmissions;
   receiving, by the processor, a second control signal from the network node;
   identifying, by the processor, one of the plurality of types of UL transmissions to perform with respect to the network node based on the second control signal;
   determining, by the processor based on the first and second control signals, a set of timing offsets from the plurality of sets of timing offsets of the transmission schedule for the identified type of the UL transmissions; and
   performing, by the processor, a UL transmission to the network node according to the transmission schedule such that:
      a first type of the UL transmission is performed with a value from a first set of timing offsets of the plurality of sets of timing offsets, and
      a second type of the UL transmission is performed with a value from a second set of timing offsets of the plurality of sets of timing offsets different than the first set of timing offsets.

2. The method of claim 1, wherein the first type of the UL transmission comprises a transmission of a UL control information (UCI) feedback multiplexed with data over a physical uplink shared channel (PUSCH), and wherein the second type of the UL transmission comprises a transmission of the UCI feedback without data over the PUSCH.

3. The method of claim 1, wherein the identifying of the one of the plurality of types of the UL transmissions comprises identifying the one of the plurality of types of the UL transmissions of a UL control information (UCI) feedback multiplexed with data over a physical uplink shared channel (PUSCH), and wherein a timing offset for the UL transmission of the UCI feedback multiplexed with data equals a timing offset for PUSCH scheduling.

4. The method of claim 1, wherein the identifying of the one of the plurality of types of the UL transmissions comprises identifying the one of the plurality of types of the UL transmissions of a UL control information (UCI) feedback without data over a physical uplink shared channel (PUSCH), and wherein a timing offset for the UL transmission of the UCI feedback multiplexed with data differs from a timing offset for PUSCH scheduling.

5. The method of claim 1, wherein the identifying of the one of the plurality of types of the UL transmissions comprises identifying the one of the plurality of types of the UL transmissions as a transmission of a UL control information (UCI) feedback without data, and wherein the receiving of the first control signal from the network node comprises:
   receiving radio resource control (RRC) signaling; and
   configuring timing offset values for the UL transmission based on the RRC signaling.

6. The method of claim 5, wherein the configuring of the timing offset values for the UL transmission comprises establishing a mapping of timing offset values for physical uplink shared channel (PUSCH) scheduling as indicated in UL grant downlink control information (DCI) in the control signal to corresponding code states.

7. The method of claim 1, wherein the determining of the plurality of sets of timing offsets of the transmission schedule based on the second control signal comprises determining the plurality of sets of timing offsets as measured from a time at which the second control signal is received.

8. The method of claim 1, wherein the performing of the UL transmission comprises performing the UL transmission under one of a plurality of sets of conditions related to one or more of a numerology, a resource allocation or size of a bandwidth part (BWP), a transport block size, a coding rate, a subband size configuration, a number of ports for channel state information (CSI) feedback, a type of CSI feedback, a number of CSI reports, and a type of bandwidth for the UL transmission.

9. The method of claim 8, wherein the identifying of the one of the plurality of types of the UL transmissions comprises identifying the one of the plurality of types of the UL transmissions of a UL control information (UCI) feedback multiplexed with data over a physical uplink shared channel (PUSCH), wherein a timing offset for the UL transmission of the UCI feedback multiplexed with data equals a timing offset for PUSCH scheduling, and wherein the UL transmission of the UCI feedback multiplexed with the data under each set of the plurality of sets of conditions is performed within a time frame of the PUSCH.

10. The method of claim 8, wherein the identifying of the one of the plurality of types of the UL transmissions comprises identifying the one of the plurality of types of the UL transmissions of a UL control information (UCI) feedback without data over a physical uplink shared channel (PUSCH), wherein a timing offset for the UL transmission of the UCI feedback multiplexed with data differs from a timing offset for PUSCH scheduling, and wherein the UL transmission of the UCI feedback without data under one or more sets of the plurality of sets of conditions is performed outside a time frame of the PUSCH.

11. An apparatus, comprising:
   a transceiver capable of wirelessly communicating with a network node of a wireless network; and
   a processor coupled to the transceiver, the processor capable of:
      receiving, via the transceiver, a first control signal from the network node;
      determining, based on the first control signal, a plurality of sets of timing offsets of a transmission schedule for a plurality of types of uplink (UL) transmissions;
      receiving, via the transceiver, a second control signal from the network node;
      identifying one of the plurality of types of UL transmissions to perform with respect to the network node based on the second control signal;
      determining, based on the first and second control signals, a set of timing offsets from the plurality of sets of timing offsets of the transmission schedule for the identified type of the UL transmissions; and performing, via the transceiver, a UL transmission to the network node according to the transmission schedule such that:

a first type of the UL transmission is performed with a value from a first set of timing offsets of the plurality of sets of timing offsets, and a second type of the UL transmission is performed with a value from a second set of timing offsets of the plurality of sets of timing offsets different than the first set of timing offsets.

12. The apparatus of claim 11, wherein the first type of the UL transmission comprises a transmission of a UL control information (UCI) feedback multiplexed with data over a physical uplink shared channel (PUSCH), and wherein the second type of the UL transmission comprises a transmission of the UCI feedback without data over the PUSCH.

13. The apparatus of claim 11, wherein in identifying the one of the plurality of types of the UL transmissions the processor is capable of identifying the one of the plurality of types of the UL transmissions of a UL control information (UCI) feedback multiplexed with data over a physical uplink shared channel (PUSCH), and wherein a timing offset for the UL transmission of the UCI feedback multiplexed with data equals a timing offset for PUSCH scheduling.

14. The apparatus of claim 11, wherein in identifying the one of the plurality of types of the UL transmissions the processor is capable of identifying the one of the plurality of types of the UL transmissions of a UL control information (UCI) feedback without data over a physical uplink shared channel (PUSCH), and wherein a timing offset for the UL transmission of the UCI feedback multiplexed with data differs from a timing offset for PUSCH scheduling.

15. The apparatus of claim 11, wherein in identifying the one of the plurality of types of the UL transmissions the processor is capable of identifying the one of the plurality of types of the UL transmissions as a transmission of a UL control information (UCI) feedback without data, and wherein in receiving the first control signal from the network node the processor is capable of:

receiving radio resource control (RRC) signaling; and
configuring timing offset values for the UL transmission based on the RRC signaling.

16. The apparatus of claim 15, wherein in configuring the timing offset values for the UL transmission the processor is capable of establishing a mapping of timing offset values for physical uplink shared channel (PUSCH) scheduling as indicated in UL grant downlink control information (DCI) in the control signal to corresponding code states.

17. The apparatus of claim 11, wherein in determining the plurality of sets of timing offsets of the transmission schedule based on the first second signal the processor is capable of determining the plurality of sets of timing offsets as measured from a time at which the second control signal is received.

18. The apparatus of claim 11, wherein in performing the UL transmission the processor is capable of performing the UL transmission under one of a plurality of sets of conditions related to one or more of a numerology, a resource allocation or size of a bandwidth part (BWP), a transport block size, a coding rate, a subband size configuration, a number of ports for channel state information (CSI) feedback, a type of CSI feedback, a number of CSI reports, and a type of bandwidth for the UL transmission.

19. The apparatus of claim 18, wherein in identifying the one of the plurality of types of the UL transmissions the processor is capable of identifying the one of the plurality of types of the UL transmissions of a UL control information (UCI) feedback multiplexed with data over a physical uplink shared channel (PUSCH), wherein a timing offset for the UL transmission of the UCI feedback multiplexed with data equals a timing offset for PUSCH scheduling, and wherein the UL transmission of the UCI feedback multiplexed with the data under each set of the plurality of sets of conditions is performed within a time frame of the PUSCH.

20. The apparatus of claim 18, wherein in identifying the one of the plurality of types of the UL transmissions the processor is capable of identifying the one of the plurality of types of the UL transmissions of a UL control information (UCI) feedback without data over a physical uplink shared channel (PUSCH), wherein a timing offset for the UL transmission of the UCI feedback multiplexed with data differs from a timing offset for PUSCH scheduling, and wherein the UL transmission of the UCI feedback without data under one or more sets of the plurality of sets of conditions is performed outside a time frame of the PUSCH.

\* \* \* \* \*